United States Patent
Sohl

(10) Patent No.: US 6,315,704 B1
(45) Date of Patent: Nov. 13, 2001

(54) ROLL FOR SMOOTHING PAPER WEBS

(75) Inventor: Carsten Sohl, Fredericia (DK)

(73) Assignee: Voith Sulzer Papiertechnik Patent GmbH, Heidenheim (DE)

( * ) Notice: Subject to any disclaimer, the term of this patent is extended or adjusted under 35 U.S.C. 154(b) by 0 days.

(21) Appl. No.: 09/538,902

(22) Filed: Mar. 30, 2000

(30) Foreign Application Priority Data

Mar. 31, 1999 (DE) ............................................. 199 14 708

(51) Int. Cl.$^7$ .................................................. B23P 15/00
(52) U.S. Cl. .................................. 492/56; 492/53; 492/59
(58) Field of Search ................ 492/50, 52, 56, 492/53, 59

(56) References Cited

U.S. PATENT DOCUMENTS

| | | |
|---|---|---|
| 3,490,119 | 1/1970 | Fukuyama et al. . |
| 4,466,164 * | 8/1984 | Tadokoro et al. ...................... 492/56 |
| 5,324,248 * | 6/1994 | Quigley ................................... 492/50 |
| 5,334,124 * | 8/1994 | Ohno ...................................... 492/52 |
| 5,387,172 * | 2/1995 | Habenicht et al. ...................... 492/56 |
| 5,776,043 * | 7/1998 | Kato et al. .............................. 492/56 |
| 5,784,961 * | 7/1998 | Lorig et al. ......................... 29/895.23 |
| 5,790,926 * | 8/1998 | Miozoe et al. .......................... 492/50 |
| 5,797,322 * | 8/1998 | Lorig et al. ............................. 492/56 |
| 5,836,860 * | 11/1998 | Watanabe et al. ...................... 492/56 |
| 5,868,839 * | 2/1999 | Kato et al. .............................. 492/56 |
| 6,021,296 * | 2/2000 | Tamura et al. ........................ 399/277 |
| 6,030,328 * | 2/2000 | Watanabe et al. ...................... 492/56 |
| 6,202,557 * | 3/2001 | Kustermann .......................... 101/376 |

FOREIGN PATENT DOCUMENTS

| | | |
|---|---|---|
| 1807331 | 6/1970 | (DE) . |
| 1621821 | 10/1971 | (DE) . |
| 2128294 | 1/1973 | (DE) . |
| 3029288 | 7/1984 | (DE) . |
| 3703564 | 8/1987 | (DE) . |
| 4339097 | 11/1994 | (DE) . |
| 19506301 | 8/1996 | (DE) . |
| 19511153 | 10/1996 | (DE) . |
| 19610949 | 9/1997 | (DE) . |
| 19736575 | 3/1999 | (DE) . |
| 2057092 | 3/1981 | (GB) . |
| 98/54405 | 12/1998 | (WO) . |

OTHER PUBLICATIONS

"Elastiche Kalanderwalzenbezuge auf Basis Faser–Kunststoff–Verbund", by N. GAMSJAGER.

* cited by examiner

Primary Examiner—I Cuda Rosenbaum
(74) Attorney, Agent, or Firm—Greenblum & Bernstein, P.L.C.

(57) ABSTRACT

A process for producing a resilient roll having a hard roll core (such as a metal) and a resilient covering layer. In forming the covering layer, a radially inner connecting layer is applied to the roll core and a radially outer functional layer is applied to the connecting layer. In addition, in forming the connecting layer and/or the functional layer, glass fibers and carbon fibers are wound simultaneously onto the roll core, the mixture ratio of glass fibers to carbon fibers being between about 60/40 and 90/10. A roll has an inner connecting layer and an outer functional layer comprising a mixture of glass fibers and carbon fibers, which are embedded in a matrix material and are distributed uniformly over the length of the roll. The mixture ratio of glass fibers to carbon fibers is between about 60/40 and about 90/10.

12 Claims, 2 Drawing Sheets

ROLL FOR SMOOTHING PAPER WEBS

CROSS-REFERENCE TO RELATED APPLICATION

The present application claims priority under 35 U.S.C. §119 of German Patent Application No. 199 14 708.6, filed Mar. 31, 1999, the disclosure of which is expressly incorporated by reference herein in its entirety.

BACKGROUND OF THE INVENTION

1. Field of the Invention

The present invention relates to a process for producing a resilient roll having a hard roll core (such as a metal) and a resilient covering layer. In forming the covering layer, an inner connecting layer is first applied to the roll core and then an outer functional layer is applied to the connecting layer. Furthermore, the invention is directed towards a roll, in particular for smoothing paper webs, having a hard roll core (such as a metal), which is provided on its outer periphery with a resilient covering layer. The resilient covering layer can comprise a radially outer functional layer and a radially inner connecting layer for connecting the functional layer to the roll core.

2. Discussion of Background Information

Resilient rolls of this type are used, for example, in the calendering of paper webs. An elastic roll and a hard roll form a press nip, through which the paper web to be processed is directed. While the hard roll has a very smooth surface, consisting, for example, of steel or hard cast iron, and is responsible for smoothing that side of the paper web which faces it, the resilient (i.e., second) roll, acting on the opposite side of the paper web serves to compact the paper web and then renders it uniform in the press nip. The resilience of the second roll therefore prevents a too intensive compaction of the paper web, which would lead to a specky appearance of the paper web.

The rolls are of the order of from about 6 to 12 m long and of from about 800 to 1500 mm in diameter. The rolls withstand line forces of up to approximately 600 N/mm and compressive stresses of up to approximately 50 $N/mm^2$. Since the tendency or trend in paper manufacture is for calendering to be carried out on-line (i.e., the paper web leaving the papermaking machine or coating machine is immediately led through the paper smoothing or calendering device), higher requirements than previously are placed on the rolls of the smoothing device, particularly with respect to their temperature resistance. The high transport speeds of the paper web, necessitated by on-line operation, and the associated high rotational speeds of the calender rolls, increase their alternating flexure frequency, which in turn leads to increased roll temperatures. These high temperatures, produced in on-line operation, lead to problems which, in the case of known resilient rolls, can lead to the destruction of the synthetic covering of the roll. On the one hand, in the case of known synthetic coverings, maximum temperature differences of about 20° C. over the width of the roll are permissible. On the other hand, the polymers normally used for the coating have a significantly higher coefficient of thermal expansion than the steel or hard cast iron rolls normally used. Accordingly, as a result of an increase in the temperature, high axial stresses occur between the steel or hard cast iron roll and the synthetic coating connected to it.

As a result of these high stresses, associated with heated locations, occurring at certain points or regions within the synthetic coating, so-called hot spots can occur, at which the separation or even the bursting of the synthetic layer takes place.

These hot spots tend to occur in particular when, in addition to the mechanical stresses and the relatively high temperature, there are crystallization points in the form of, for example, faulty adhesive bonds, deposits or above-average bulges in the resilient covering. These bulges can occur, for example, as a result of creases or foreign bodies on the paper web. In such cases, the temperature at these crystallization points can rise from a normal of about 80° C. to 90° C. to more than 150° C., which results in the aforementioned destruction of the synthetic layer.

SUMMARY OF THE INVENTION

The present invention relates to a process for producing a resilient roll having a hard roll core and a resilient covering layer. The process includes forming the covering layer by applying a radially inner connecting layer to the roll core and then applying a radially outer functional layer to the connecting layer. In forming at least one of the connecting layer and the functional layer, glass fibers and carbon fibers are simultaneously wound onto the roll core.

Further, the glass fibers and the carbon fibers are wound onto the roll core in glass fiber and carbon fiber rovings. Each roving comprises a plurality of fibers of identical type positioned beside one another. During the winding, a plurality of glass fiber and carbon fiber rovings positioned beside one another and adjoining one another are simultaneously wound onto the roll core to form a roving layer.

According to a further feature of the present invention, in forming at least one of the connecting layer and the functional layer, a number of roving layers are wound over another one.

Additionally, before being wound onto the roll core, the glass fibers and carbon fibers are surrounded with a matrix material, the matrix material comprising a resin/hardener combination. The glass fibers and carbon fibers can also be drawn through a resin/hardener bath.

According to another feature of the invention, the glass fibers and the carbon are wound substantially dry onto the roll core and have a soft matrix material applied to glass fibers and carbon fibers while the glass fibers and carbon fibers are being wound onto the roll core. The glass fibers and carbon fibers are completely embedded in the matrix material.

According to yet another feature of the invention, the glass fibers and carbon fibers are wound substantially dry onto the roll core and have a soft matrix material applied to the glass fibers and carbon fibers, after the glass fibers and carbon fibers have been wound onto the roll core. The glass fibers and carbon fibers are completely embedded in the matrix material. The matrix material can be a resin/hardener combination.

According to a further feature, the matrix material can be one of a thermosetting polymer and a thermoplastic polymer. Further, the fiber content of the connecting layer can be about 40 to 70% by volume. Yet further, the fiber content of the connecting layer can be about 50 to 60% by volume. Preferably, the fiber content of the connecting layer can be about 55% by volume.

In addition, the fiber content of the functional layer can be about 5 to 20% by volume. Preferably, the fiber content of the functional layer can be about 8 to 12% by volume.

The present invention also relates to a roll, for use in smoothing paper webs. The roll can have a hard roll core provided with a resilient covering layer. The covering layer can include a radially outer functional layer and a radially inner connecting layer that connects the functional layer to the roll core. Further, at least one of the connecting layer and the functional layer can be made up of a mixture of glass fibers and carbon fibers, which are embedded in a soft matrix material and are distributed substantially uniformly over the length of the roll core. The mixture ratio of glass fibers to carbon fibers can be between about 60/40 and about 90/10.

The matrix material can be a polymer. Further, the matrix material can be a resin/hardener combination. The roll core can be a metal roll core.

According to a feature of the invention, the mixture ratio of glass fibers to carbon fibers can be about 70/30.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE INVENTION

Figure 1:
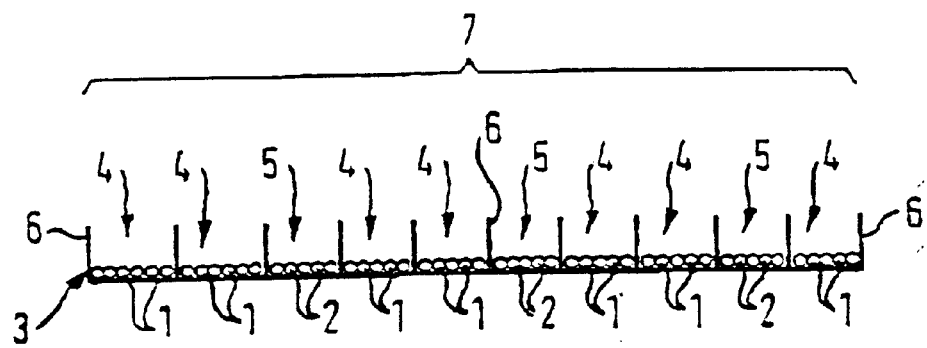
FIG. 1 shows a schematic cross-sectional illustration of a device for separating fibers into rovings.

It is an object of the present invention to provide a process for producing a resilient roll of the type previously mentioned, as well as a corresponding roll, in which the risk of the occurrence of hot spots is reduced, with at least constant mechanical characteristics.

To accomplish this object, relating to the process, according to the present invention, in forming the connection layer and/or the functional layer, glass fibers and carbon fibers are wound simultaneously onto the roll core. The mixture ratio of glass fibers to carbon fibers is between about 60/40 to about 90/10. Preferably, the glass/carbon fiber ratio is about 70/30.

A roll, according to the present invention, has an inner connecting layer and/or a functional layer comprising a mixture of glass fibers and carbon fibers, which are embedded in a soft matrix material and are, in each case (i.e., both the glass fibers and the carbon fibers), distributed essentially uniformly over the length of the roll. The mixture ratio of glass fibers to carbon fibers is between about 60/40 to about 90/10. Preferably, the mixture ratio of glass to carbon fibers is about 70/30.

In a roll which is produced or constructed in this way, the connecting layer both forms an optimal, mechanical, stress-optimized connection between the metal core roll and the outer functional layer and also ensures improved thermal conduction and thus removal of excessive heat energy from any overheating points or regions.

As a result of the simultaneous application or mixing of glass fibers and carbon fibers in the ratio specified according to the features of the present invention, their characteristics are optimally combined with one another. While glass fibers have a coefficient of thermal expansion which is relatively close to that of steel, they have a relatively poor thermal conductivity. On the other hand, the thermal conductivity of carbon fibers is very high. Furthermore, carbon fibers have a stiffness which is about three times as high as glass fibers.

As a result of the mixture ratio specified according to the present invention, and the embedding the fiber mixture in the matrix material of the connecting layer, an optimum transition layer between the steel roll and the outer functional layer is produced. Since, in the connecting layer, the thermal expansion in the axial direction is predominantly determined by the inlaid fibers, the overall coefficient of thermal expansion of the connecting layer with the fiber materials comes very close to that of the steel roll. Further, due to the presence of the resilient matrix material, the connecting layer also has a certain resilience in the axial direction. Thus, the stresses occurring between the roll core and the outer functional layer as a result of heating in the axial direction are absorbed by the connecting layer, and the stress loads are thus reduced overall.

Furthermore, as a result of the fibers being inlaid in the matrix material of the connecting layer, in addition to providing an increase in the stiffness of the connecting layer, an improvement in the thermal conductivity within the connecting layer is achieved. This improvement in the thermal conductivity is achieved particularly by the carbon fibers, so that heat produced at points within the connecting layer can be dissipated in the axial direction via the carbon fibers, before such intensive overheating occurs that a hot spot is produced.

According to a further feature or embodiment of the invention, the glass fibers and the carbon fibers are wound onto the roll core in the form of glass fiber and carbon fiber rovings. A roving comprises a large number of fibers of identical type laying beside one another. During the winding procedure, a large number of glass fiber and carbon fiber rovings lying beside one another and adjoining one another are simultaneously wound onto the roll core to form a roving layer. The winding of rovings provides a very uniform distribution of the glass and carbon fibers. Thus, it is possible for the mixture ratio according to the present invention to be provided in an optimum way.

In order to form the connecting layer and/or the functional layer, a number of roving layers are preferably wound over one another, so that the desired thickness of the connecting layer can be easily produced. Thus, each of the roving layers has the mixture ratio of glass fibers to carbon fibers according to the invention. It is further possible for this mixture ratio to be varied as required between individual roving layers within the values defined according to the invention.

In order to permit the embedding of the fibers in the matrix material, before being wound onto the roll core, the glass fibers and carbon fibers can be surrounded by a soft matrix material, in particular with a resin/hardener combination. In particular, the glass fibers and carbon fibers can be drawn through a resin/hardener bath. In principle, however, it is also possible for the glass fibers and the carbon fibers to be wound essentially dry onto the roll core and to have a soft matrix material, in particular, a resin/hardener combination, applied to them, during or after the winding operation. Thus, the glass fibers and carbon fibers can be completely embedded in the matrix material.

As a result of the virtually complete embedding of the fibers in the matrix material, the connecting layer is given the necessary resilience. The matrix material also serves as a connecting material between the outer functional layer and the roll core. In principle, however, it is also possible for there to be an additional contact layer, for example an adhesive layer, between the metal outer surface of the roll core and the connecting layer as well.

The matrix material preferably consists of a polymer material, in particular a thermosetting polymer or a thermoplastic polymer. The term "soft," as used in connection with the matrix material, is to be understood only in relation to the outer side of the metal roll, in particular steel roll, which is referred to as "hard."

According to a further advantageous embodiment of the invention, the fiber content of the connecting layer is about 40 to 70% by volume. In particular, the fiber content of the connecting layer can be about 50 to 60% by volume. Preferably, the fiber content can be about 55% by volume. The fiber content of the connecting layer determines both its stiffness and its thermal conductivity as well as the overall coefficient of expansion. The fiber content according to the invention ensures that the optimum mechanical and thermal characteristics of the connecting layer mentioned previously set forth are maintained.

In contrast to the connecting layer, the fiber content of the functional layer is preferably about 5 to 20% by volume. Particularly, the fiber content of the functional layer can be about 8 to 12% by volume. As a result of the reduced fiber content, the functional layer has a lower stiffness than the connecting layer, as is necessary for evening and compacting the paper web to be treated during calendering. If, because of the reduced fiber content, the coefficient of thermal expansion of the functional layer becomes too high, this coefficient can be reduced by an appropriate addition of fillers to the matrix material of the functional layer.

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken together with the drawings making apparent to those skilled in the art how the several forms of the present invention may be embodied in practice.

FIG. 1 shows a plurality of glass fibers 1 and carbon fibers 2, illustrated in cross section, which are combined by a comb-like or rake-like collecting unit 3, in each case (i.e., with respect to both carbon fibers and glass fibers), to form single-layer fiber bundles. These fiber bundles are generally referred to as rovings 4, 5.

In each case a glass fiber roving 4 or a carbon fiber roving 5 is separated from the next roving 4, 5 by a tooth 6 of the collecting unit 3, so that a unique mixture ratio of glass fibers within the roving tape 7, formed by the glass fiber and carbon fiber rovings 4, 5, and a predefined distribution of glass fibers and carbon fibers along the width of the roving tape 7 are ensured.

The mixture ratio between carbon fibers and 2 glass fibers 1 is about 30/70, each roving 4, 5 comprising, for example, 10,000 to 14,000 individual glass and carbon fibers 1, 2 each having a thickness of for example between 0.1 and 0.3 mm. In the present case, the roving tape 7 comprises ten rovings 4, 5, but in principle the roving tape can also comprise more or fewer rovings, for example 8 to 16 rovings.

Whereas in FIG. 1 the rovings 4, 5 are illustrated in schematic form as being disposed in a single layer, in practice a roving consists of a large number of fiber layers. Each individual fiber has a diameter from about 8 to 12 $\mu$m and a roving has a thickness of about 0.1 to 0.3, for example 0.2 mm. An essential factor is that the width of a roving 4, 5 is significantly greater, with respect to its thickness, so that it can be considered to have, for practical purposes, a single-layer construction.

Figure 2:
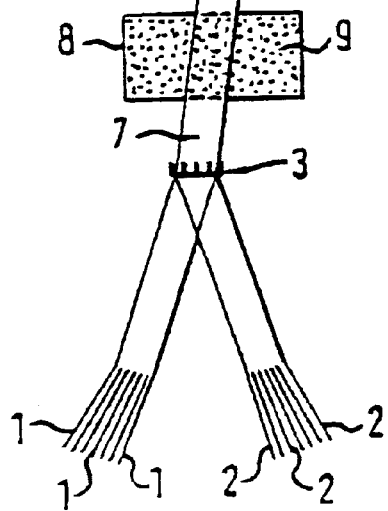
FIG. 2 shows a schematic illustration of a roll according to the invention during its production.

FIG. 2 illustrates how the glass fibers 1 and the carbon fibers 2 are directed over and through the collecting unit 3 and combined into a roving tape 7, after which they are led through a schematically shown impregnation device 8. In the impregnation device 8, the individual rovings 4, 5 are coated with a liquid matrix material 9, so that the rovings 4, 5 are essentially completely embedded in the matrix material 9. The matrix material can be a polymer. In particular, the matrix material can be a resin/hardener combination.

The roving tape 7, surrounded completely with the matrix material 9 by the impregnation device 8, is wound onto a roll core 10 from edge to edge, so that following a winding pass over the entire length of the roll core 10, the latter is completely coated with one roving layer.

This coating operation can be repeated a number of times, until a connecting layer 11 with a required thickness of, for example, about 3 to 10 mm, has been produced.

Figure 3:
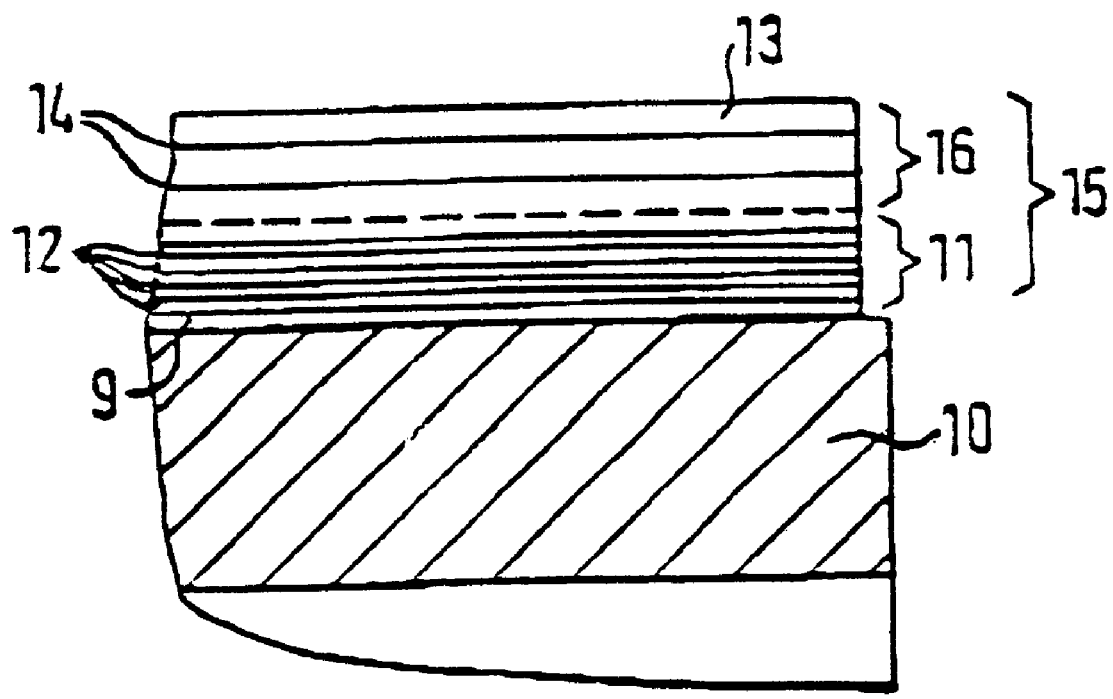
FIG. 3 shows a partial longitudinal section through a roll constructed according to the invention.

The construction of the connecting layer 11 is illustrated in more detail in FIG. 3. FIG. 3 shows the connecting layer 11 as consisting of a large number of roving layers 12 lying one above another radially of the core 10. Each of the roving layers 12 is embedded in the matrix material 9. The proportion of the fibers 1, 2 of the roving layers 12 in the connecting layer 11 is about between 40 to 70% by volume, so that the mechanical and thermal characteristics of the connecting layer 11 are predominately determined by the fibers 1, 2.

In order to form a covering layer 15, radially outwardly of the connecting layer 11, and in contact therewith, a functional layer 16 is provided.

The functional layer 16 comprises a matrix material 14 which, in particular, can be the same as the matrix material 9. Roving layers 14 corresponding to the roving layers 12 of the connecting layer 11 are also embedded in the functional layer 16. However, the proportion by volume of fibers in the roving layers 14, with respect to the volume of the functional layer 16, is considerably lower than the proportion of fibers in the roving layers 12 and, for example, is 8 to 12% by volume. As a result of this reduced fiber content, the functional layer 16 is significantly more resilient than the connecting layer 11.

As a result of the glass fibers 1 and carbon fibers 2 being embedded in the matrix material 9 of the connecting layer 11, the coefficient of thermal expansion of the connecting layer 11 has a predetermined value which is close to the coefficient of thermal expansion of the roll core 10, which consists of steel, for example. In the event of a temperature increase occurring during operation of the roll, a longitudinal expansion of the roll core 10 occurring in the axial direction is therefore accompanied by a corresponding expansion of the connection layer 11, so that longitudinal stresses occurring between the roll core 10 and the connecting layer 11 in the axial direction are minimized. Although the functional layer 16, whose coefficient of thermal expansion is predominately determined by the matrix material 13 (i.e., by the resin/hardener mixture), expands considerably more in the axial direction, as a result of a corresponding increase in temperature, the longitudinal stresses produced because of the connection between the functional layer 16, the connecting layer 11 and the roll core 10 are largely absorbed by the resilience of the connecting layer 11.

In addition, the carbon fibers contained in the roving layers 12 and 14 result in a very good axial thermal conductivity of the connecting layer 11 and/or the functional layer 16, so that the heat from any overheating points or regions which may arise within the connecting layer 11 can be dissipated rapidly in the axial direction. As a result, the temperature within the connecting layer 11 and the functional layer 16 remains reliably below a critical limiting temperature. In this way, the occurrence of hot spots in the connecting layer 11 can reliably be prevented.

It is noted that the foregoing examples have been provided merely for the purpose of explanation and are in no way to be construed as limiting of the present invention. While the present invention has been described with reference to certain embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed:

1. A roll, adapted for use in smoothing paper webs, having a hard roll core and a resilient covering layer, the covering layer comprising a radially outer functional layer and a radially inner connecting layer that connects the functional layer to the roll core, at least one of the connecting layer and the functional layer comprising a mixture of glass fibers and carbon fibers, which are embedded in a matrix material and which are distributed substantially uniformly over the length of the roll core, the mixture ratio of glass fibers to carbon fibers being between about 60/40 and about 90/10.

2. The roll according to claim 1, wherein the matrix material is a polymer.

3. The roll according to claim 1, wherein the matrix material is a resin/hardener combination.

4. The roll according to claim 1, wherein the fiber content of the connecting layer is about 40 to 70% by volume.

5. The roll according to claim 1, wherein the fiber content of the functional layer is about 5 to 20% by volume.

6. The roll according to claim 1, said roll core comprising a metal roll core.

7. The roll according to claim 1, wherein the mixture ratio of glass fibers to carbon fibers is about 70/30.

8. The roll according to claim 1, wherein the matrix material is one of a thermosetting polymer and a thermoplastic polymer.

9. The roll according to claim 1, wherein the fiber content of the connecting layer is about 50 to 60% by volume.

10. The roll according to claim 1, wherein the fiber content of the connecting layer is about 55% by volume.

11. The roll according to claim 1, wherein the fiber content of the functional layer is about 8 to 12% by volume.

12. The roll according to claim 3, wherein the at least one of the connecting layer and the functional layer are embedded in the matrix material by being drawn through a bath of the matrix material.

* * * * *